Patented Jan. 19, 1937

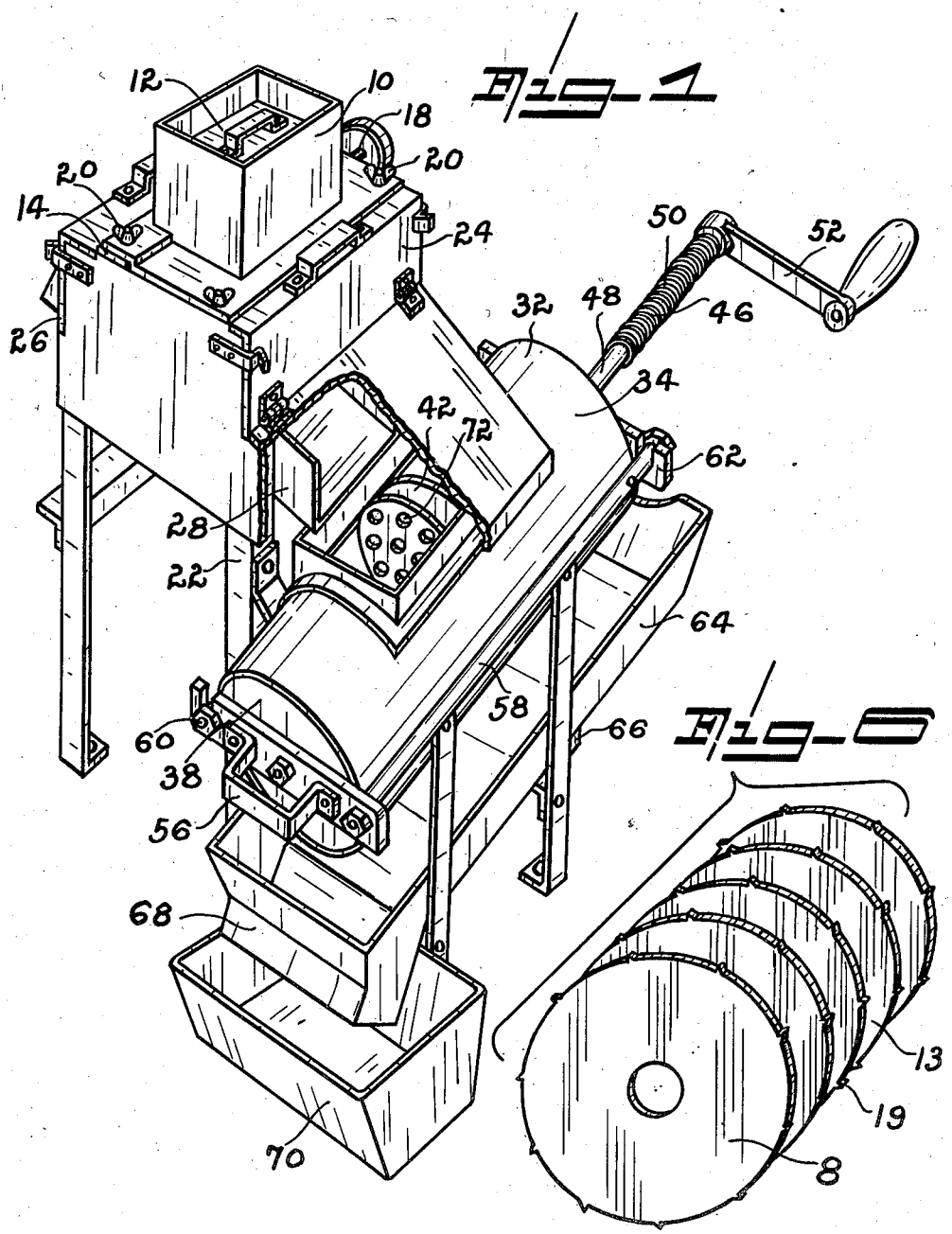

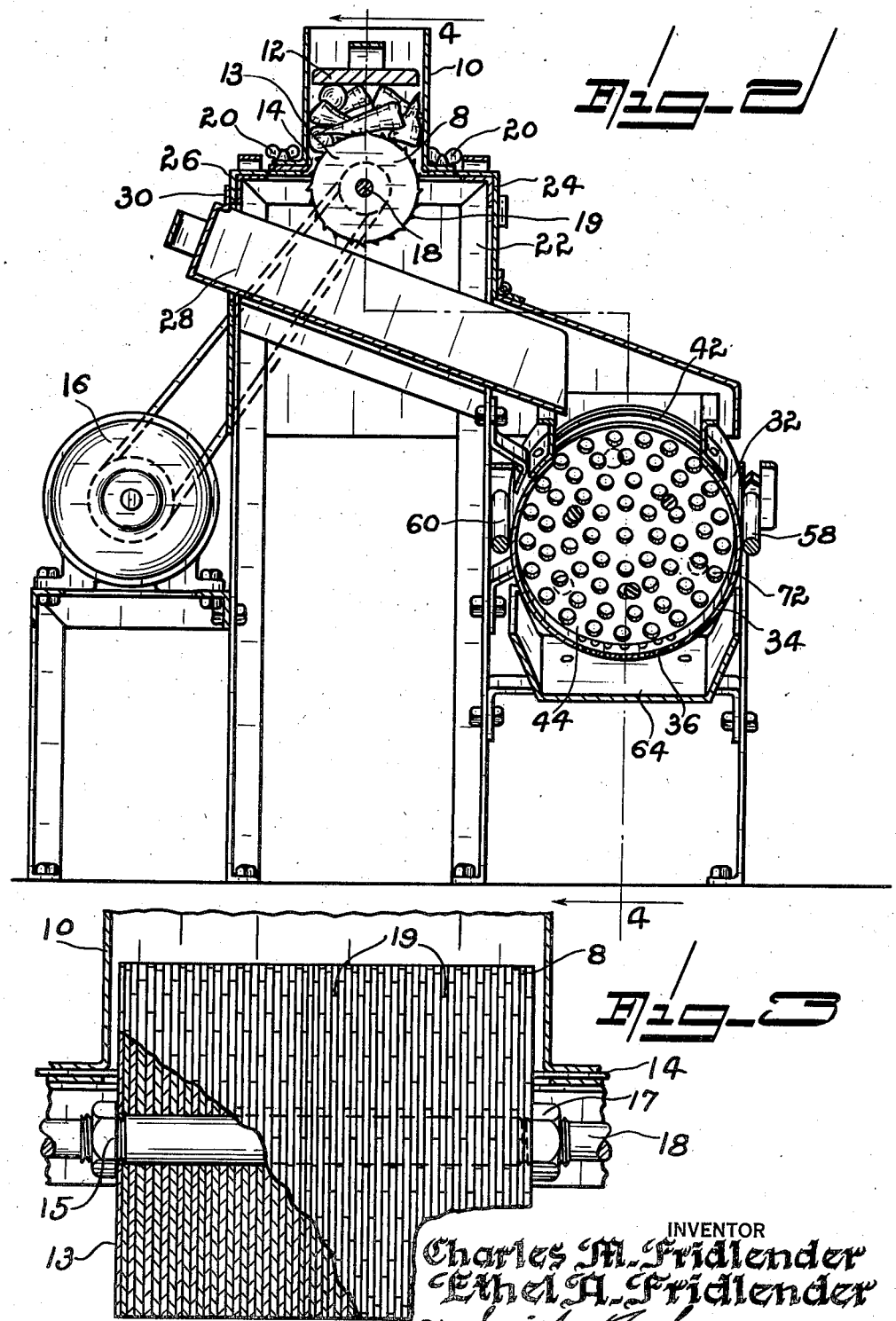

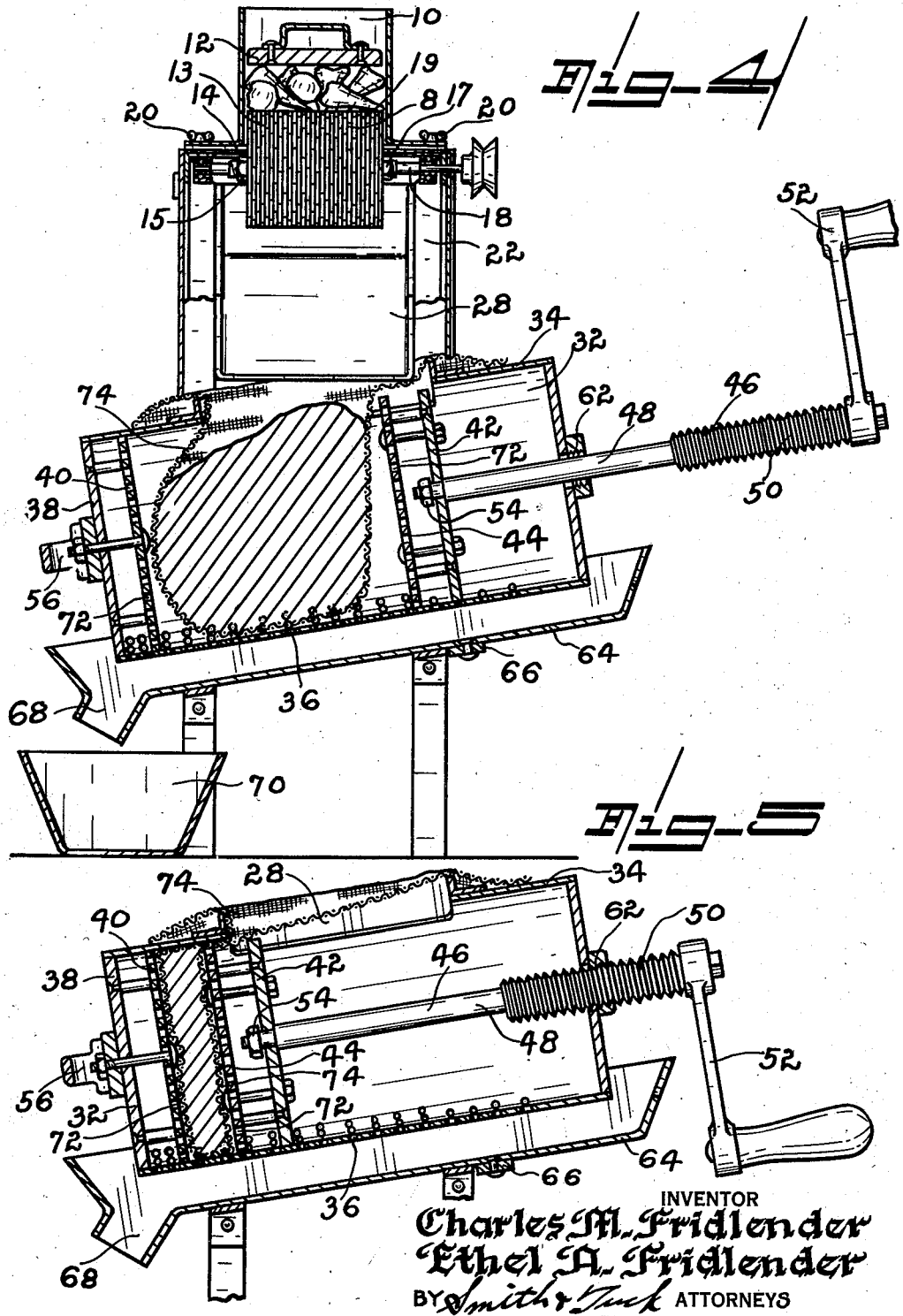

2,068,013

UNITED STATES PATENT OFFICE 2,068,013

JUICE EXTRACTOR

Charles M. Fridlender and Ethel A. Fridlender, Seattle, Wash.

Application September 18, 1933, Serial No. 689,962

1 Claim. (Cl. 146—123)

Our present invention relates to the art of juice extracting machines and more particularly to a machine which is intended to extract the juices from uncooked fruit and vegetables.

It is well known fact that fruit and vegetables contain vitamins which are of great help in building up and maintaining the human system. It is a well known fact that many vitamins are lost when fruits or vegetables are cooked such as is so often done in the extraction of juices. With our present equipment we provide means whereby the cellular structure of various fruits and vegetables can be broken or so finely comminuted that the juices are available for complete extraction. To provide equipment which will satisfactorily extract a large percentage of the juices contained in fruit and vegetables it is necessary that the different parts of the machine be so proportioned and used in such a combination that the desired result can be obtained.

The principal object of our present invention is to provide equipment which will so finely break up the vegetable or fruit pulp that all the juices will be available for extraction.

A further object of our present invention is to provide a combination with a finely dividing comminuting means, a press which because of its particular construction will permit of the extraction of all of the available juices.

A further object of our invention is to provide equipment which in addition to performing the comminuting of vegetable and fruit pulp, the thorough pressing thereof, a machine which will lend itself to thorough and easy cleaning to the end that various fruits or vegetables may be passed thru the machine one after the other in small quantities without the long delay so often incidental to the thorough cleaning of the machine between each different fruit or vegetable.

Other and more specific objects will be apparent from the following description taken in connection with the accompanying drawings, wherein Figure 1 is a perspective view showing the relationship between the various parts of our fruit juice extractor.

Figure 2 is a vertical cross sectional view thru the various elements making up our equipment.

Figure 3 is a detailed view partly in section showing the method of building up our cutting rotor.

Figure 4 is a cross sectional view taken along the line 4—4 of Figure 2.

Figure 5 is a fragmentary sectional view showing a portion of Figure 4 in a different phase relationship.

Figure 6 is an exploded view showing in greater detail some of the segments of my cutting rotor.

Referring to the drawings, throughout which like reference characters indicate like parts, 8 designates the cutting rotor which is used in the comminuting of the vegetables or fruit passing thru my machine. This rotor is so mounted in a hopper 10 that fruit or vegetables placed in said hopper, particularly when pressed downwardly by follower 12, will be subject to the gradual wearing away and cutting action of the teeth of rotor 8. The final cutting is accomplished between the teeth and the renewable shearing plate 14 which acts to free the teeth of pulp. Now it is necessary that rotor 8 be revolved at a very high speed. To this end we normally provide a high speed electric motor 16 as a driving means which is connected to shaft 18 of rotor 8 by means of speed increasing gearing or a belt having step-up pulleys.

It is rather essential that the rotor be so constructed that as the teeth will be presented to the produce as individual teeth and not sufficiently close together so that two or more teeth, acting somewhat as a single large tooth, might tear out a large piece of fibre from the vegetables or fruit. A very satisfactory way of forming such a rotor is after the teachings of Figures 3, 4 and 6 in which a plurality of metal discs 13 are threaded onto an arbor 18 and secured in tight relationship to each other by means of some adequate securing means similar to the opposed nuts 15 and 17. This permits us to form a large number of rotor plates 13 and have the teeth as 19 formed on all the different plates in a single machine-operation, then by virtue of the fact that relatively few teeth are employed on each plate, they can be revolved slightly with reference to each other so that a spacing similar to that indicated in Figure 3 can be obtained. Here the teeth are spaced with the idea of having each of the adjacent teeth as far apart as possible so that no two teeth can act to tear out a single bit of the pulp as one large piece, it being very essential that the teeth be made quite small so that at their high speed each tooth will take but a very tiny bite into the vegetable or fruit passed thru the machine. It might be considered that just a very tiny shaving is taken off such as one might use in preparing a microscope slide for instance, so that the juices in each individual cell will be liberated and thus make it possible to get a full extraction of the juices from the pulp.

To aid in the cleaning of our machine we provide that the hopper 10 will be easily removable by means of the wing nuts 20. Cover members 24 and 26 are provided to prevent pulp or juice being thrown about and at the same time provide means so that the machine can be disassembled down to the frame work 22, permitting thorough and convenient cleaning.

Disposed beneath rotor 8 is an inclined pulp receiving pan 28 which is provided with stop means at 30 to limit the downward travel of the pan and permit its easy removal upwardly. Pan 28 acts as a depository for the finely divided pulp, from which it can be drawn into the press 32. Press 32 consists of a cylindrical body portion 34 which is perforated in its lower periphery by a plurality of openings 36. It is further provided with a head portion 38 which has facedly disposed therefrom the perforated plate 40. Disposed for longitudinal movement within the cylindrical body 34 is the presser piston 42 which in turn, similar to the end 38, has a spaced head member 44 which is perforated throughout its entire area by rather small holes as is member 40. Piston 42 is controlled in its movements within cylinder 34 by means of the threaded shaft 46. This shaft has a reduced portion 48 and then an enlarged threaded portion 50. The outer end may be supplied with any suitable motive power. For convenience in filling and which provides a satisfactory means in a small machine we have shown a hand crank 52. The opposite end of shaft 46 is reduced to provide a shoulder for engagement in piston 42 and a nut 54 is secured on the extreme end of shaft 46 so that shaft 46 may revolve without the necessity of turning, with it, piston 42.

Now it has been found that even with the most careful design of such a press that considerable pressure must be exerted on the pulp and it has been found desirable to provide the end plate or head 38 with a handle portion 56 which is notched at each end to accommodate thru rods disposed on each side of the press as 58 and 60. Similarly at the opposite ends of the press a bar similar to handle 56 as 62 is provided so that it can engage in any easily disengageable manner the thru rods 58 and 60. These rods are fixedly secured to cylinder 34 and thus provide a very convenient means for easily disassembling and reassembling. At the same time the cylinder head is adequately held against being pressed out of its desired position when unusual strains are placed on piston 44 during the pressing operations.

Disposed immediately below press 34 is a sloping receiver 64. This as was true of pan 28, is arranged so as to be easily removed. Any tendency for it to slip downwardly is arrested by the stop means 66. The lower end of pan 64 I normally prefer to provide with a spout like discharge opening 68 arranged for discharge into any suitable receptacle as 70.

Method of operation

In using our juice extractor it is desirable that the fruit or vegetables that are going to be used, be thoroughly cleaned. In many instances this requires the actual peeling of the fruit or vegetable. In other instances it is desirable that the skin itself be passed thru the machine. The cleaned produce is placed in hopper 10 and the follower 12 placed on top thereof. The machine is started and the rotor turns at very high speed, a peripheral speed of 6,000 feet per minute being desirable. This gives a very high speed on the tooth line of the rotor so that instead of the teeth taking a large bite into the produce it takes but a very tiny shaving off the same and by virtue of the fact that a large number of teeth are employed and that the teeth are staggered in their relationship, the fruit or vegetables are reduced to a very fine pulp which falls downwardly into the pan 28 and from there either flow by themselves or are assisted until they are deposited into press 32.

Now it has been found most desirable to employ fine cotton cloth or other suitable material so that the finely ground products will not be forced thru the opening 72 occurring in both of the head members 40 and 44 and in the cylinder 34 itself as opening 36. This cloth is shown at 74 in Figure 4 and is shown in the position it will assume when the produce are placed into the press. As soon as a suitable charge has been deposited therein handle 52 is grasped and the piston moved downwardly towards head 40 until the threaded portion of shaft 46 at 50 engages the threaded portion of bar 62. Then a rotary movement is applied to handle 52 and the actual pressing of the product is accomplished.

It is in the pressing operation that the full value of the spaced plate 40 and 44 is obtained. The juices which have been liberated in the finely divided pulp exude thru the openings 36 and 72, in the final stages of the pressing operation almost entirely thru the openings 72 in plates 40 and 44. This is particularly true when the pulp is very firmly compressed and the value of having the perforations in each plate lies in the fact that the juice has a very little distance to travel thru the pulp which is not true in the various other presses that have been observed, most of which cause the juices from the axial part of the pulp pack to travel entirely thru the pulp pack until they reach openings in the periphery of the cylindrical portion of the press. With our present construction this is not necessary as the solid plates 38 and 42 are spaced considerably back of the perforated plates 40 and 44. As a result of this construction a very high degree of extraction is accomplished with the minimum of applied pressure and in the shortest possible time.

After the juices have been collected or as they are being collected in pan 64, a strainer is usually applied to the outlet 68 so that grading is given the juices. It may be necessary to further strain the juices to remove therefrom the little bits of pulp that may have gone thru cloth 74. With this equipment we have been able to obtain a very high percentage of juice extraction from many of the very difficult vegetables including carrots for instance yielding a very high percentage of their bulk in juice and with this means where the products are so finely divided and pressed under such ideal conditions as high a percentage of juice can be extracted as can be extracted in the usual processes which require the cooking of the produce. The resultant gain with the process is that those vitamins which might be lost in the cooking process are all retained for their full health giving qualities and as a result juices extracted under this process have been proven to be of great value in the building up of those human systems which need the valuable mineral salts contained in vegetables and also need to take full advantage of the vitamins contained in the various foods which may be necessary for their physical well-being or recovery.

The foregoing description and the accompanying drawings are believed to clearly disclose a preferred embodiment of our invention but it will be understood that this disclosure is merely illustrative and that such changes in the invention may be made as are fairly within the scope and spirit of the following claims.

Having thus fully described our invention, what we claim as new and desire to secure by Letters Patent is:—

The combination with a supporting frame, and a closure having a cover plate, of a removable feed hopper having a flanged base plate forming the top of the closure and fastening means therefor, a removable shearing plate located on top of the closure and retained by the flanged base plate, a rotary shaft and a plurality of circular cutter disks mounted thereon, means for revolving the shaft, a removable pulp-receiving trough located in and supported by the closure beneath the cutter disks, a stop flange at the upper rear end of the trough for engagement with the cover plate, spring hooks at opposite sides of the closure engaging the cover-plate, and said cutter disks having their upper portions projecting upwardly into the hopper and adjacent to the shearing plate and their lower portions located in the closure.

CHARLES M. FRIDLENDER.
ETHEL A. FRIDLENDER.